(12) United States Patent
Schlitz et al.

(10) Patent No.: US 7,472,777 B2
(45) Date of Patent: Jan. 6, 2009

(54) BRAKE DISK COMPRISING A FRICTION RING AND A BRAKE DISK POT

(75) Inventors: Helmut Schlitz, Hildrizhausen (DE); Michael Niestegge, Ulm (DE); Spyridon Rigopoulos, Bietigheim-Bissingen (DE); Bjoern Spangemacher, Sindelfingen (DE)

(73) Assignee: Daimler AG, Stuttgart (DE)

( * ) Notice: Subject to any disclaimer, the term of this patent is extended or adjusted under 35 U.S.C. 154(b) by 106 days.

(21) Appl. No.: 10/556,122

(22) PCT Filed: May 3, 2004

(86) PCT No.: PCT/EP2004/004657
§ 371 (c)(1),
(2), (4) Date: Nov. 9, 2005

(87) PCT Pub. No.: WO2004/102027
PCT Pub. Date: Nov. 25, 2004

(65) Prior Publication Data
US 2006/0272905 A1 Dec. 7, 2006

(30) Foreign Application Priority Data
May 14, 2003 (DE) ............................. 103 21 796

(51) Int. Cl.
*F16D 65/12* (2006.01)
(52) U.S. Cl. .............................. 188/218 XL; 188/18 A
(58) Field of Classification Search ........... 188/218 XL, 188/18 A
See application file for complete search history.

(56) References Cited

U.S. PATENT DOCUMENTS

| 4,049,085 | A | * | 9/1977 | Blunier | 188/18 A |
|---|---|---|---|---|---|
| 6,035,507 | A | * | 3/2000 | Bianchi | 29/407.05 |
| 6,098,764 | A | * | 8/2000 | Wirth et al. | 188/218 XL |
| 6,357,561 | B2 | * | 3/2002 | Ruiz | 188/218 XL |
| 2002/0153214 | A1 | * | 10/2002 | Bauer et al. | 188/251 A |
| 2002/0157908 | A1 | * | 10/2002 | Burgoon et al. | 188/218 XL |
| 2004/0031651 | A1 | * | 2/2004 | Lehmann et al. | 188/218 XL |

FOREIGN PATENT DOCUMENTS

| DE | 34 32 501 A1 | 3/1986 |
|---|---|---|
| DE | 88 16 836 U1 | 10/1990 |
| DE | 297 10 533 U1 | 1/1998 |
| DE | 94 22 141 U1 | 5/1998 |

(Continued)

*Primary Examiner*—Robert A Siconolfi
*Assistant Examiner*—Vu Q Nguyen
(74) *Attorney, Agent, or Firm*—Patent Central LLC; Stephan A. Pendorf

(57) ABSTRACT

The invention relates to a brake disk (2) comprising a friction ring (4) and a brake disk hub (6). Both the friction ring (4) and the brake disk hub (6) are provided with a ring land (8, 10) which overlap in a concentric manner. The ring land (8, 10) encompass recesses (14, 16) through which a joining arrangement (12) is guided in the form of a connecting pin (20). Also provided is a support ring (18) which encloses the ring land (8) of the friction ring (4) in a sandwich-type manner along with the ring land (10) of the brake disk hub (6). The support ring (18) comprises recesses (22) within which ends of the connecting pin (20) are supportingly mounted.

6 Claims, 3 Drawing Sheets

FOREIGN PATENT DOCUMENTS

| | | |
|---|---|---|
| DE | 198 02 040 A1 | 7/1999 |
| DE | 198 59 616 A1 | 7/2000 |
| EP | 0 872 659 A1 | 10/1998 |
| GB | 1 412 758 A | 11/1975 |
| JP | 2001-173689 A | 6/2001 |
| JP | 2002-048167 A | 2/2002 |

* cited by examiner

BRAKE DISK COMPRISING A FRICTION RING AND A BRAKE DISK POT

CROSS REFERENCE TO RELATED APPLICATION

This application is a national stage of PCT/EP2004/004657 filed May 3, 2004 and based upon DE 103 21 796.7 filed May 14, 2003 under the International Convention.

BACKGROUND OF THE INVENTION

1. Field of the Invention

The invention relates to a brake disk.

2. Related Art of the Invention

Recently tribologically highly resistant materials are increasingly used for modern high performance brake disks. Here for example metal-matrix-composites (MMC) or carbon fiber reinforced ceramics on the bases of silicon carbide can be utilized. For car racing, friction rings based on carbon fiber reinforced carbon (C/C) are preferably utilized. Suchlike materials necessitate the usage of different materials for the friction ring and the brake disk hub. Friction ring and brake disk hub together constitute the brake disk.

Various proposals have already been disclosed for the connection between friction ring and brake disk hub. A commonly utilized connection between the friction ring and the brake disk hub is a conventional screw connection. An example for such a screw connection is disclosed in DE 94 22 141 U1. Another form of connection between friction ring and brake disk hub is the riveted joint, as disclosed in EP 872 659 A1.

Both aforementioned constructions have in common, that the friction ring as well as the brake disk hub feature ring lands, which are layered above each other concentrically, and are connected by a joining arrangement. Usually bores are featured in the ring lands through which the joining arrangement passes. The disadvantage of this construction is that during the transmission of the braking torque flexural stress is induced into the ring land of the friction ring. Such a flexural stress may cause fissures in the comparatively brittle ceramic friction ring. Therefore a huge design-engineering effort is necessary to prevent fissuring in the friction ring.

SUMMARY OF THE INVENTION

The objective of the invention is to create a brake disk with a separate friction ring and brake disk hub, in which the stresses which act upon the friction ring through the joining arrangement are reduced in comparison to the state of the art.

The bake disk according to the invention features a friction ring and a brake disk hub. Here the term brake disk hub is understood as a linking element in general, which constitutes the connection between the friction ring and the hub of the wheel. In the case that the friction ring is directly attached to the hub of the wheel, the wheel hub itself is regarded as the brake disk hub according to the invention. The friction ring is understood as the part of the brake disk which contacts the brake pads in a retarding engagement.

The brake disk hub as well as the friction ring features a concentric ring land. Both ring lands feature a number of recesses. One joining arrangement passes through each of the recesses of the ring lands of the friction ring and the brake disk hub.

The invention is characterized by a support ring which is arranged such that it encloses the ring land of the friction ring together with the ring land of the brake disk hub in the manner of a sandwich. Additionally, a connecting pin of the joining arrangement is arranged such that it is supported in the recesses of the support ring which correspond with the recesses of the ring lands of the brake disk hub and the friction ring.

Thereby each joining arrangement running through the recesses of the ring lands is supported by one recess of the support ring. The joining arrangements are in this manner connected to each other. The support or bearing through the support ring prevents the individual joining arrangement from inducing flexural stress onto the recesses of the ring land of the friction ring. Hence a revolving force acts onto each recess of the ring land of the friction ring from which a compression stress results in the direction of load transmission. Particularly in ceramic parts a compression stress causes much less fissures than flexural stress, which without the support ring according to the invention would act upon the ring land of the friction ring.

In one embodiment of the invention connecting pins are shrunk into the recesses of the support ring. Hence the connecting pins are perpendicular to the support ring and run through the recesses of the ring lands of the friction ring and the brake disk hub, and are screwed tight on the side of the brake disk hub. For this a thread is provided on the connecting pin on one side of the brake disk hub. A nut sits on this thread of the connecting pin and is tightened so that the support ring is pushed against the ring land of the friction ring.

In another embodiment of the invention the connecting pin features a bolt head and on its other end a thread by which it is screwed into the recess of the support ring.

The recesses of the brake disk hub can be open radially towards the outside. Thereby a radial expansion of the brake disk hub is made possible. This radial expansion of the brake disk hub can also be allowed for by a recesses in the form of a slotted hole.

The present invention is particularly advantageous for a friction ring which consists of a fiber reinforced ceramic on the basis of silicon carbide. Such friction rings exhibit a high tribological strength, are exceptionally temperature resistant and, in comparison to other ceramics, are very damage tolerant due to their fiber reinforcement.

BRIEF DESCRIPTION OF THE DRAWINGS

Advantageous embodiments of the invention will be described in detail with the illustrations below. They show.

DETAILED DESCRIPTION OF THE INVENTION

Figure 1:
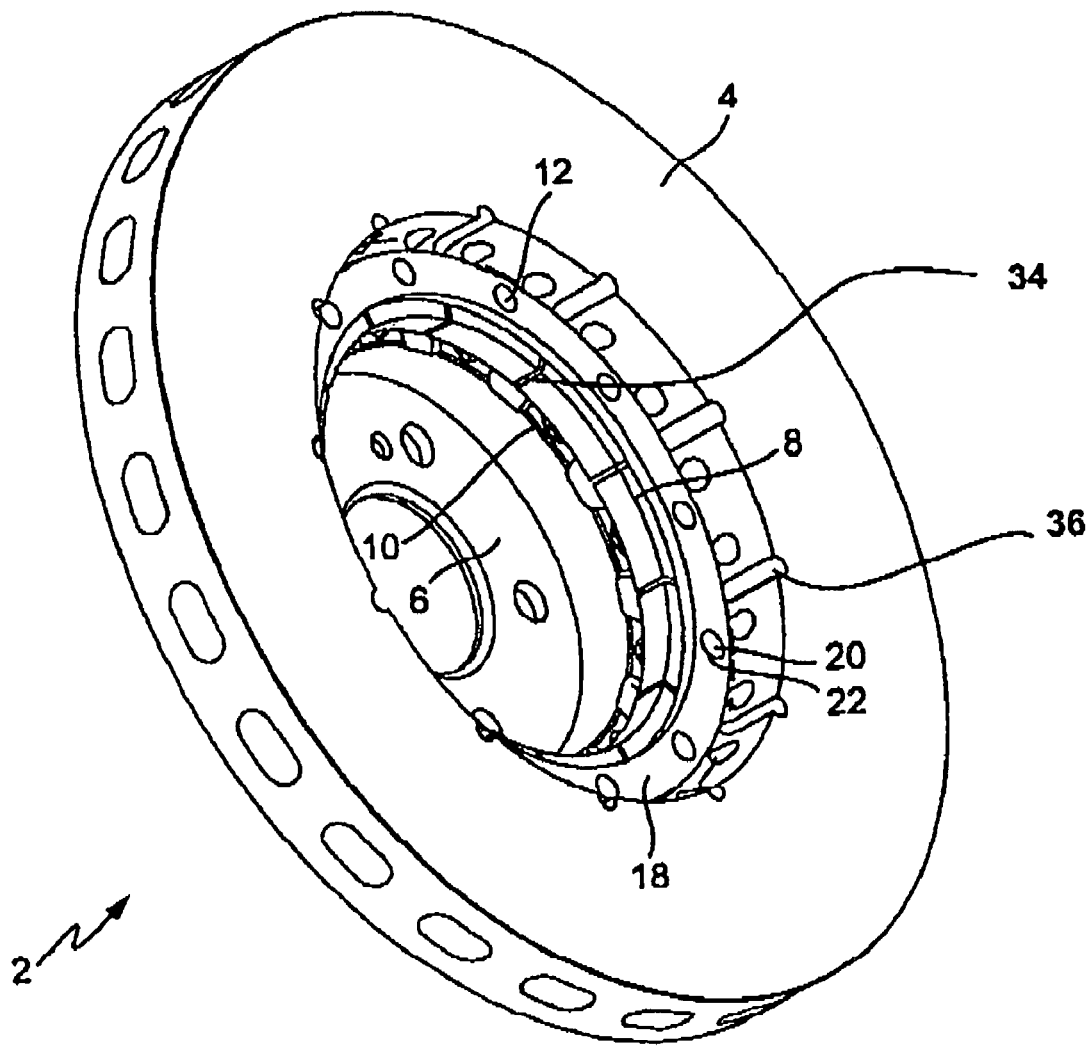
FIG. 1 a perspective view of a brake disk with a friction ring, a brake disk hub and a support ring, FIG. 2 a cross sectional view through a brake disk with a brake disk hub, a friction ring and a support ring, FIG. 3 a schematic illustration of the joining arrangement between friction ring and brake disk hub with a support ring, FIG. 4 a schematic illustration of a joining arrangement between friction ring and brake disk hub with a support ring.

The brake disk 2 shown in FIG. 1 includes a friction ring 4 and a brake disk hub 6. The friction ring 4 in this embodiment is comprised of a fiber reinforced silicon carbide ceramic.

The friction ring 4 as well as the brake disk hub 6 feature ring lands 8 and 10. The ring lands 8 and 10 in turn feature recesses 14,16 in the friction ring 4 and in the brake disk hub 6 respectively. These recesses 14 and 16 are shown in the cross sectional view of FIG. 2 and they are not visible in FIG. 1.

In the brake disk 2 according to FIG. 1 there is also shown a support ring 18 which is arranged such that it encloses like a sandwich the ring land 8 of the friction ring 4 together with the ring land 10 of the brake disk hub 6. Herein "like a sandwich" means that in an axial direction first the ring land 10 of the brake disk hub 6 and then the ring land 8 of the friction ring 4 and subsequently the support ring 18 occur. The ring lands 8 and 10 and the support ring 18 feature recesses 14, 16 and 22, which are arranged such that they form a continuous bore.

Figure 2:
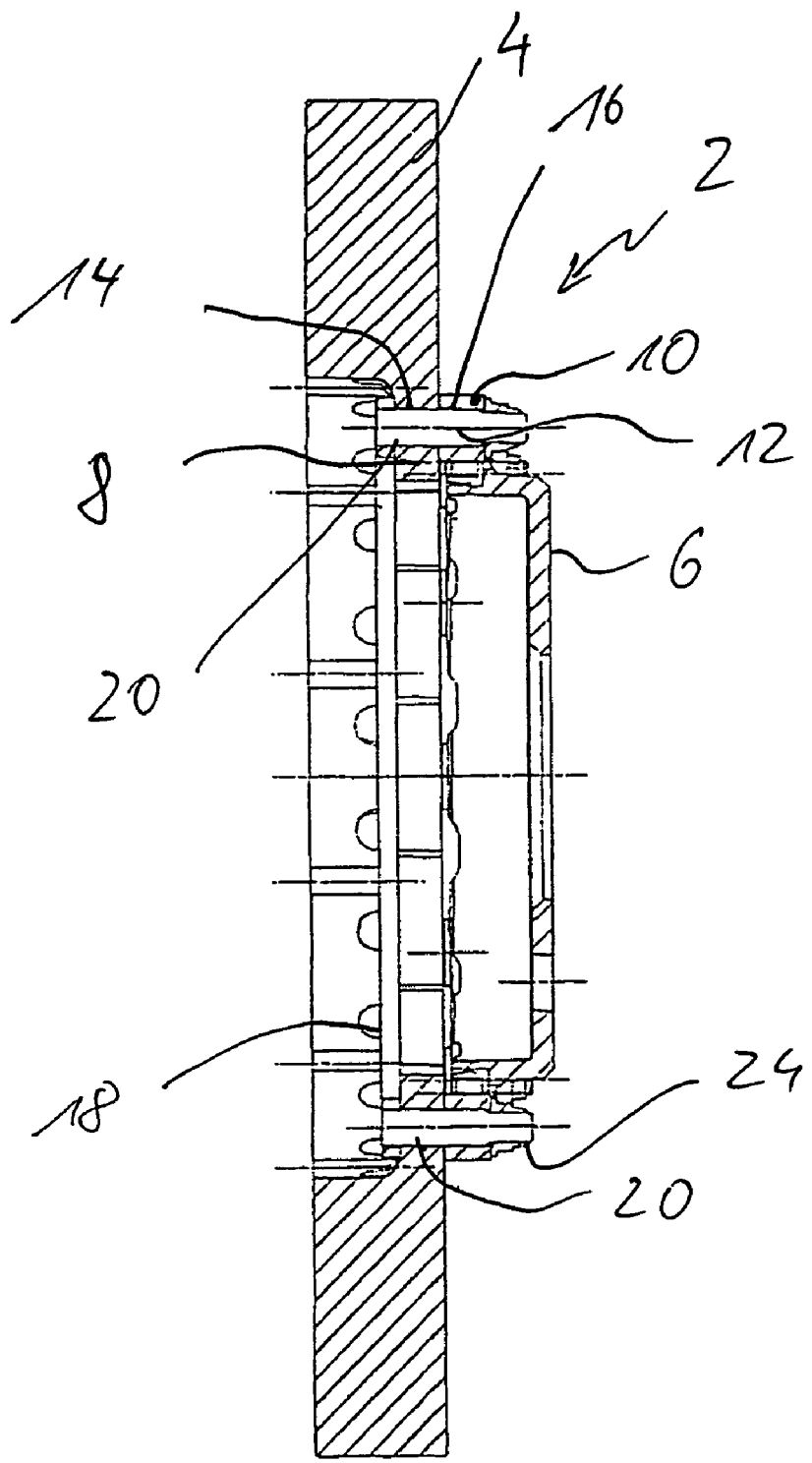

A joining arrangement 12 is routed through the recesses 14, 16 and 22 (compare also FIG. 2). The joining arrangement 12 comprises of a connecting pin 20 and a nut 24 (FIG. 2).

The ring land 8 of the friction ring 4 exhibits slots 34 in the circumferential direction which point radially outwards and feature an end bore 36 on their outer end. The slots 34 are arranged such that they are each located equidistant between the recesses 14 in the ring land 8 of the friction ring 4. The slots 34 interrupt the ring land 8, which is advantageous in the case of expansion caused by thermal stress. The end bores 36 serve the prevention of notch stress on the radial ends of the slots 34.

Figure 3:
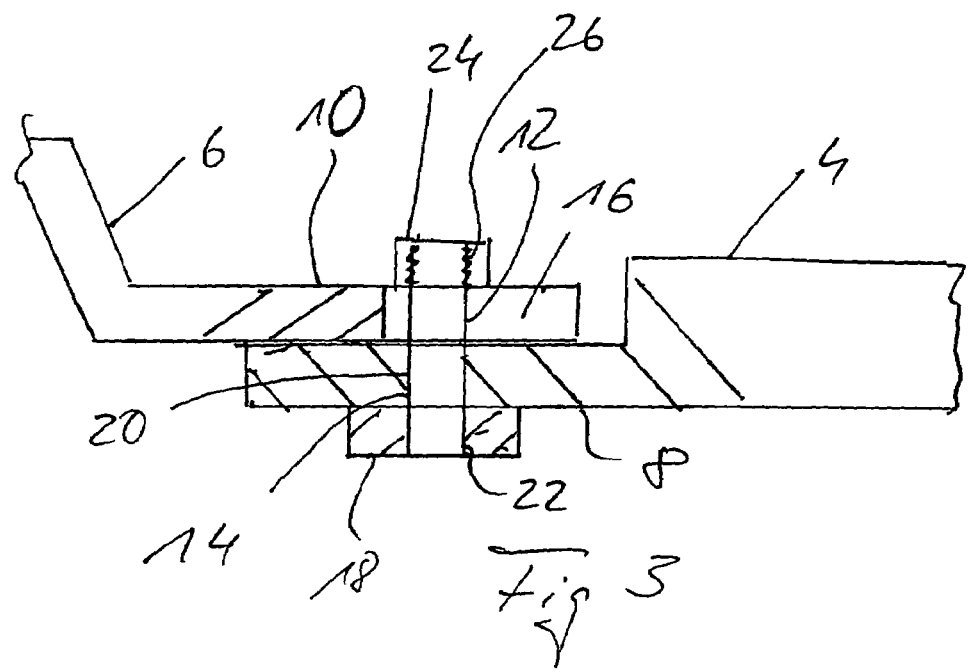
Figure 4:
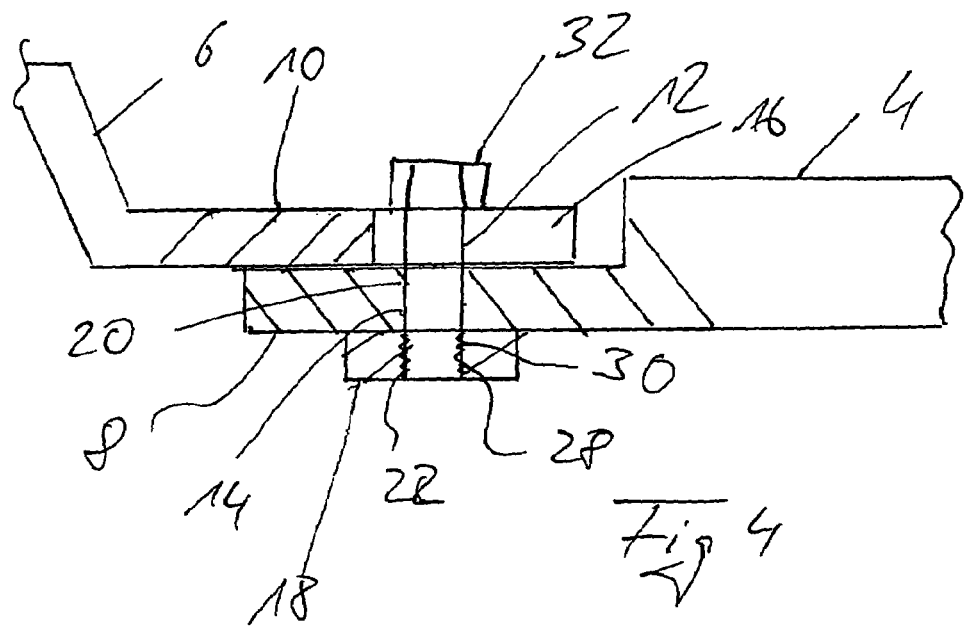

In FIGS. 3 and 4 two embodiments of joining arrangements 12 are shown schematically. In the brake disk arrangement shown in FIGS. 3 and 4 the disk brake is not identical with the one shown in FIGS. 1 and 2. Nevertheless the same reference numbers are used for parts with similar or the same function. The embodiment in FIG. 3 features a friction ring 4 and a brake disk hub 6. Both in turn feature an ring land 8 respectively which overlap each other. The ring lands 8 and 10 feature recesses 14 and 16 wherein the recesses 16 in the brake disk hub 4 are in the shape of a radial slot. This oblong recess 16 provides room for a radial expansion of the brake disk hub 6 at elevated temperatures, without inducing flexural stress in the friction ring 4.

It maybe useful to introduce a sliding block (not shown here) between the connecting pin 20 and the recess 16 which provides for a radial expansion between the joining arrangement 12 and the brake disk hub 6.

The connecting pin 20 in FIG. 3 is arranged such that it is shrunk into a recess 22 of the support ring 18. The shrinking is usually done by a heat treatment of the support ring 18, in which the cold connecting pin 20 is inserted, wherein said connecting pin 20 constitutes a frictional connection with the support ring 18 after it has cooled down.

The connecting pin 20 perpendicularly extends through the recess 22 of the support ring 18. The connecting pin 20 is guided through the recesses 14 and 16 of the ring lands 8 and 10. On the end opposing the support ring 18 the connecting pin 20 features a thread 26. A nut 24 sits on this thread 26.

The nut 24 is tightened against the ring land 10 of the brake disk hub 6 whereby the support ring 18 is compressed against the ring land 8 of the friction ring 4. The frictional connection between support ring 18 and connecting pin 20 is sufficient to counteract a screw torque and to constitute a frictional connection between the ring lands 8 and 10 and herewith between the friction ring 4 and the brake disk hub 6.

An axial clearance between the friction ring 4 and the brake disk hub 6 may be necessary to provide for thermal expansion in the axial direction. For this, a resilient element may be utilized which is not shown in FIG. 3. Such a resilient element may be constituted by a disk spring washer between friction ring 4 and nut 24. Further, it is possible to ensure a resilient effect through an (also not shown) intermediate element between the connecting pin 20 and the recess 16.

Another schematic illustration of the joining arrangement 12 is shown in FIG. 4. Here the connecting pin 20 features a bolt head 32 on one of its ends. On its other end the connecting pin 20 features a thread 28. In this embodiment the connecting pin 20 is not shrunk into the support ring 18, but it is screwed in. Other than that, the embodiment shown in FIG. 4 is equivalent to FIG. 3.

FIG. 1 through 4 show preferred embodiments, in which the joining arrangements are constituted by a screw or threaded connection. Fundamentally the advantageous effects of the support ring can be achieved through other joining arrangements. Therein e.g. a riveted connection or a combination of riveted connection and frictional connection, such as shrink fitting, can be utilized. It is also conceivable to use material connecting or adhesive bonds, e.g. welding or brazing.

We claim:

1. A brake disk (2) with at least one friction ring (4) which is connected to a brake disk hub (6) by means of a joining arrangement (12) in which the friction ring (4) and the brake disk hub (6) each feature a concentric ring land (8, 10) and the ring lands (8, 10) of the friction ring (4) and the brake disk hub (6) overlap, wherein elements of the joining arrangement (12) pass through recesses (14, 16) in the ring lands (8, 10), said brake disk further comprising a support ring (18) such that the ring land (8) of the friction ring (4) is located between the support ring (18) and the ring land (10) of the brake disk hub (6), wherein the ring lands (8, 10) are connected by means of connecting pins (20) which are fixed in recesses (22) of the support ring (18), and wherein the ring land (8) of the friction ring (4) exhibits slots (34) in a radial direction, which are arranged circumferentially around the ring land (8) and which run from an inside of the ring land (8) into the friction ring (4), and feature an end bore (36) on their outer end, which runs partially through the ring land (8) and through the friction ring (4), wherein the friction ring (4) is thicker than the ring land (8), wherein a step is formed at a location where the ring land (8) is connected to the friction ring (4), and wherein the end bore (36) runs through the step.

2. The brake disk according to claim 1, wherein the connecting pins (20) are engaged into the recesses (22) in the support ring (18).

3. The brake disk according to claim 1, wherein the connecting pins (20) feature a thread (26) on one side of the brake disk hub (6) and are fastened with a nut (24).

4. The brake disk according to claim 1, wherein the connecting pins (20) are screwed into the support ring (18).

5. The brake disk according to claim 1, wherein the recesses (16) in the ring land (10) of the brake disk hub (6) are open radially outwards.

6. The brake disk according to claim 1, wherein the friction ring (4) consists of a fiber reinforced ceramic on the basis of silicon carbide.

* * * * *